United States Patent [19]
Sage, Sr.

[11] Patent Number: 5,876,051
[45] Date of Patent: Mar. 2, 1999

[54] FOLDING STEP FOR A RECREATIONAL VEHICLE

[76] Inventor: Gary A. Sage, Sr., 3106-2 Lost Creek Rd., Anaconda, Mont. 59711

[21] Appl. No.: 578,461

[22] Filed: Dec. 26, 1995

[51] Int. Cl.[6] ..................................................... B60R 3/00
[52] U.S. Cl. .......................................... 280/166; 296/156
[58] Field of Search ............................... 280/163, 164.1, 280/166, 169; 296/156, 62; 182/91, 95, 97, 159, 127, 165

[56] References Cited

U.S. PATENT DOCUMENTS

| | | | |
|---|---|---|---|
| 560,752 | 5/1896 | Prator | 280/166 |
| 2,296,789 | 9/1942 | Johnson | 280/763.1 |
| 3,462,170 | 8/1969 | Smith et al. | 280/166 |
| 3,463,509 | 8/1969 | Schiffner | 280/166 |
| 3,529,850 | 9/1970 | Montalto | 280/763.1 |
| 3,876,230 | 4/1975 | Phillips | 280/166 |
| 3,889,997 | 6/1975 | Schoneck | 280/166 |
| 4,021,071 | 5/1977 | Norman | 182/97 |
| 4,108,457 | 8/1978 | Garrett | 280/166 |
| 4,664,227 | 5/1987 | Hansen | 182/92 |
| 4,869,520 | 9/1989 | Cole | 280/164.1 |
| 4,911,264 | 3/1990 | McCafferty | 280/163 |
| 4,982,974 | 1/1991 | Guidry | 280/166 |
| 5,024,420 | 6/1991 | Downing | 296/156 |
| 5,660,405 | 8/1997 | Campbell | 280/166 |

*Primary Examiner*—Brian L. Johnson
*Assistant Examiner*—Jim McClellan
*Attorney, Agent, or Firm*—Michael I. Kroll

[57] ABSTRACT

A folding step (10) for a recreational vehicle (12 having an existing step (14)) at a side door (16). The folding step (10) comprises a tread (18) and a structure (20) for attaching the tread (18) to the existing step (14) with the tread (18) in front, between the existing step (14) and the ground (22). The transition from the ground (22) to the interior of the recreational vehicle (12) through the side door (16) is easier to negotiate by a person stepping up.

19 Claims, 2 Drawing Sheets

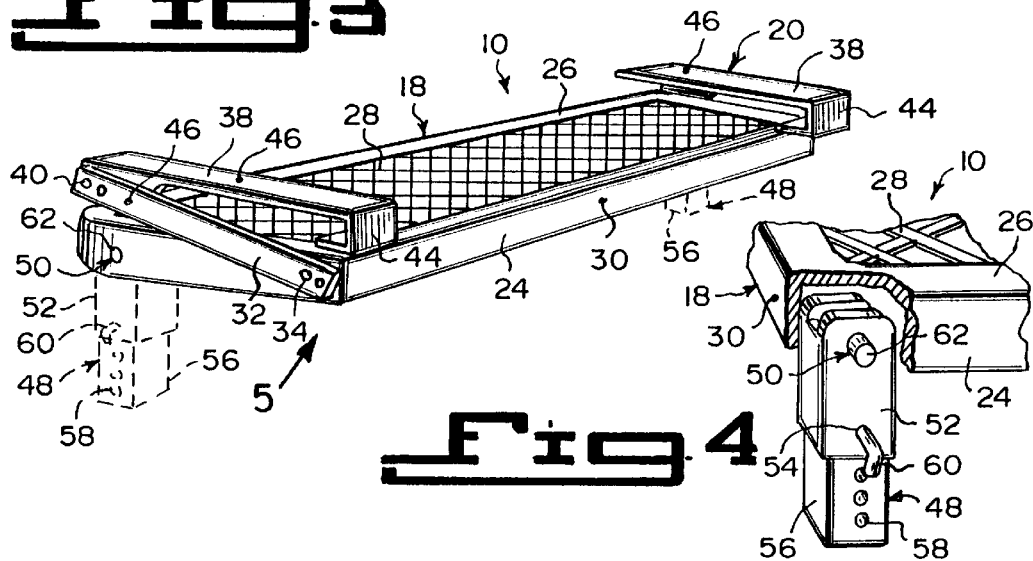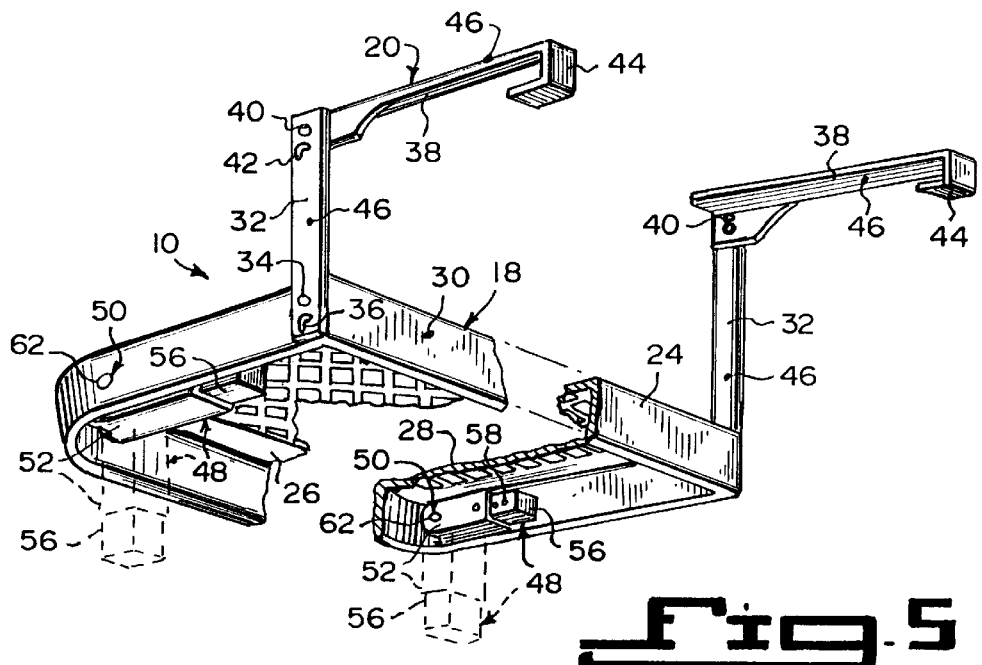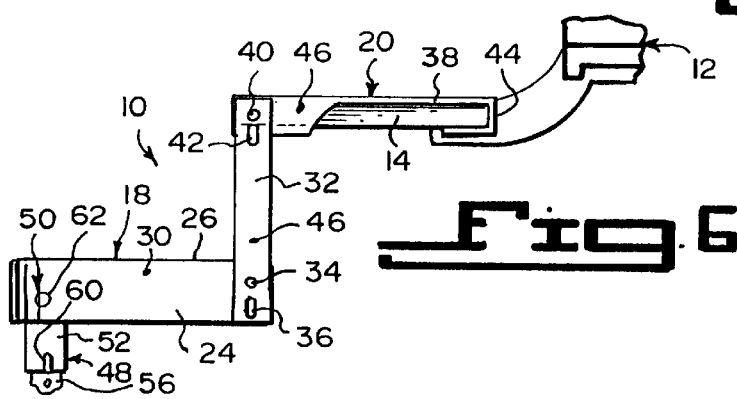

FOLDING STEP FOR A RECREATIONAL VEHICLE

BACKGROUND OF THE INVENTION

1. Field of the Invention

The instant invention relates generally to recreational vehicles and more specifically it relates to a folding step for a recreational vehicle.

2. Description of the Prior Art

Numerous recreational vehicles have been provided in prior art that are adapted to combine transportation and temporary living quarters for travel, recreation and camping. They are either motorized motor homes and van conversions or towable units, such as folding camping trailers, truck campers, travel trailers and park trailers. While these units may be suitable for the particular purpose to which they address, they would not be as suitable for the purposes of the present invention as heretofore described.

SUMMARY OF THE INVENTION

A primary object of the present invention is to provide a folding step for a recreational vehicle that will overcome the shortcomings of the prior art devices.

Another object is to provide a folding step for a recreational vehicle that is designed to supplement an existing step on the recreational vehicle, so the transition from ground level to the interior of the recreational vehicle through a side door is easier to negotiate by a person stepping up.

An additional object is to provide a folding step for a recreational vehicle which will help people of all ages to enter and exit the recreational vehicle easier, whereby anyone who has experienced the difficulty of using just the single step on the recreational vehicle, will appreciate the clear advantage of using the present invention.

A further object is to provide a folding step for a recreational vehicle that is simple and easy to use.

A still further object is to provide a folding step for a recreational vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 3 is a top perspective view of the instant invention per se taken in the direction of arrow 3 in FIG. 2, in a collapsed position.

FIG. 4 is an enlarged top perspective view of the area indicated by arrow 4 in FIG. 2 with parts broken away and in section, showing one of the adjustable support legs in greater detail.

FIG. 5 is a bottom perspective view taken in the direction of arrow 5 in FIG. 3, with parts broken away and in section, showing the riser side rails and bracket arms in the extended position.

FIG. 6 is a side view taken in the direction of arrow 6 in FIG. 2, with parts broken away.

Similar reference characters denote corresponding features consistently throughout the attached drawings.

DETAILED DESCRIPTION OF THE PREFERRED EMBODIMENTS

Figure 1:
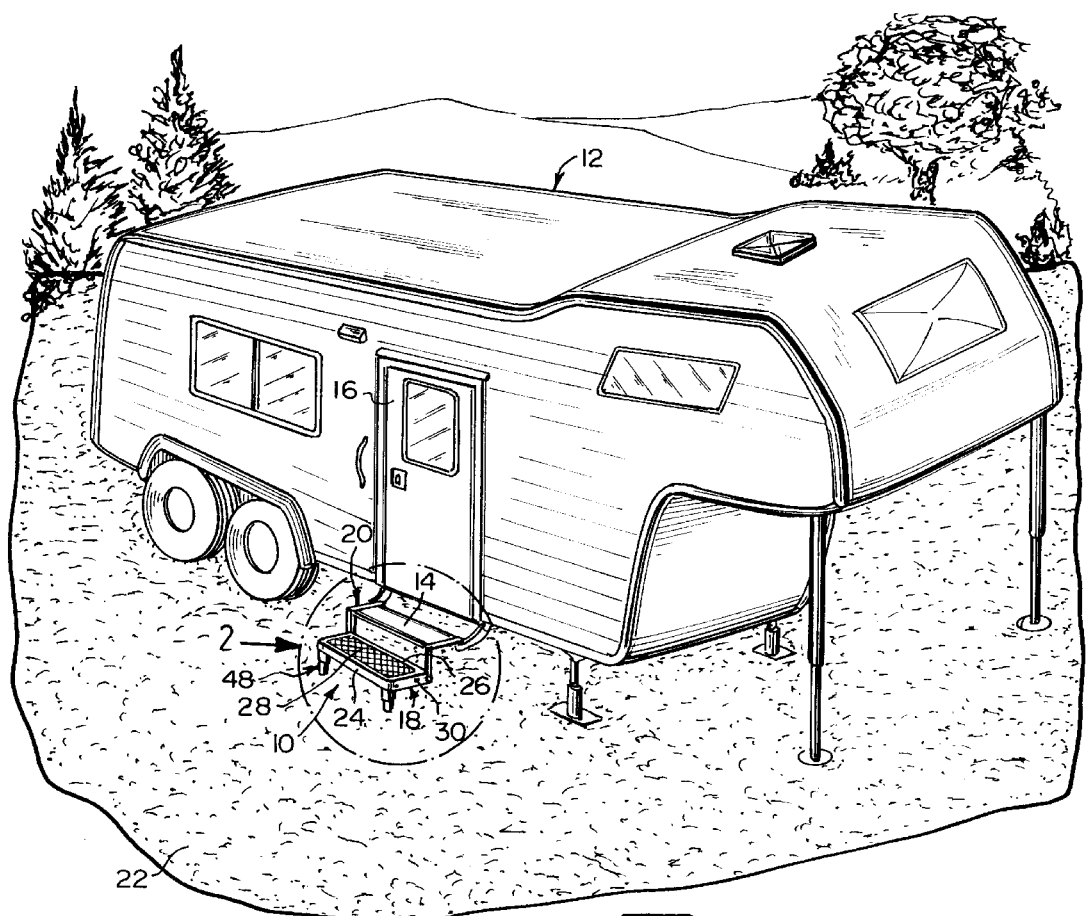
FIG. 1 is a top perspective view of a recreational vehicle with the instant invention installed to the existing step.
Figure 2:
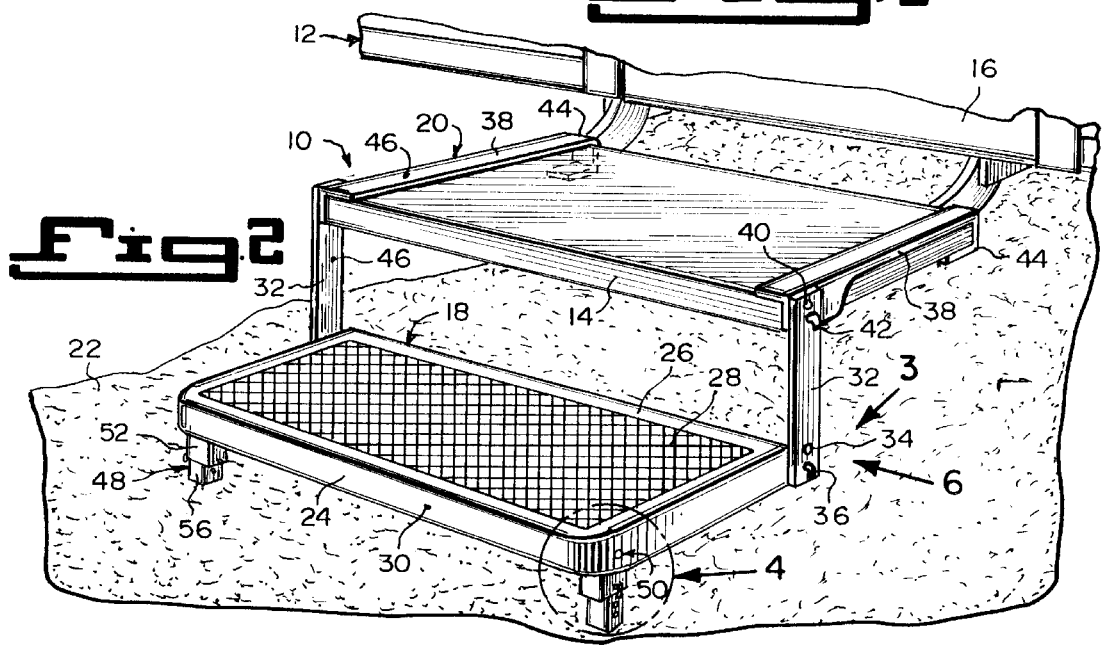
FIG. 2 is an enlarged top perspective view of the area indicated by arrow 2 in FIG. 1, showing the instant invention in greater detail.

Turning now descriptively to the drawings, in which similar reference characters denote similar elements throughout the several views, FIGS. 1 through 6 illustrate a folding step 10 for a recreational vehicle 12 having an existing step 14 at a side door 16. The folding step 10 comprises a tread 18 and a structure 20 for attaching the tread 18 to the existing step 14 with the tread 18 in front, between the existing step 14 and the ground 22. The transition from the ground 22 to the interior of the recreational vehicle 12 through the side door 16 is easier to negotiate by a person stepping up.

The tread 18 includes a rigid skirt border 24 that serves as a frame for a central horizontal section 26. The tread 18 contains a non-skid surface 28 on the central horizontal section 26. The tread 18 is fabricated out of a lightweight sturdy material 30. The lightweight sturdy material is aluminum.

The attaching structure 20 consists of a pair of riser side rails 32, with a pair of first pivot pins 34. Each first pivot pin 34 pivotally connects a first end of one riser side rail 32 to a rear corner of the tread 18. A pair of first lock pins 36 are provided. Each first lock pin 36 can be inserted through the first end of one riser side rail 32 and into the tread 18 to keep the riser side rail 32 in a stationary vertical position with respect to the tread 18.

A pair of bracket arms 38 with a pair of second pivot pins 40 are provided. Each second pivot pin 40 pivotally connects a second end of one riser side rail 32 to a first end of one bracket arm 38. A pair of second lock pins 42 are provided, whereby each second lock pin 42 can be inserted through the second end of one riser side rail 32 and into one bracket arm 38, to keep the bracket arm 38 in a stationary horizontal position with respect to and away from the tread 18. A pair of hook ends 44 are also provided. Each hook end 44 is integral with a second end of one bracket arm 38. The bracket arms 38 can lie on top of the existing step 14 of the recreational vehicle 12, with the hook ends 44 engaging a rearward facing side of the existing step 14.

The riser side rails 32, are fabricated out of a durable metal material 46. The durable metal material 46 is corrosion-resistant steel. The bracket arms 38 and the hook ends 44 are also fabricated out of the durable metal material 46.

The folding step 10 for the recreational vehicle 12 further contains a pair of adjustable support legs 48. A component 50 is for pivotally connecting upper ends of each adjustable support leg 48 to an inner front corner of the tread 18. The adjustable support legs 48 can pivot up into a horizontal position for storage and can also pivot down into a vertical position, to contact the ground 22 and help stabilize the tread 18 above the ground 22.

Each adjustable support leg 48 includes a hollow upper segment 52 having an aperture 54 therethrough. The hollow upper segment 52 is affixed to the pivotally connecting component 50. A lower segment 56 has a plurality of spaced apart adjustment holes 58 therethrough. The lower segment 56 slide fits into the hollow upper segment 52. A lock pin 60 is inserted through the aperture 54 in the hollow upper segment 52 and into one of the adjustment holes 58 in the lower segment 56, to keep the lower segment 56 in a stationary position with respect to the hollow upper segment 52.

The pivotally connecting components 50 are a pair of shafts 62. Each shaft 62 extends through an upper end of one adjustable support leg 48 and the inner front corner of the tread 18. Each adjustable support leg 48 is fabricated out of the durable metal material 46, which is corrosion-resistant steel.

LIST OF REFERENCE NUMBERS 10 folding step
12 recreational vehicle
14 existing step
16 side door
18 tread of 10
20 attaching structure of 10
22 ground
24 rigid skirt border of 18
26 central horizontal section of 18
28 non-skid surface on 26
30 lightweight sturdy material (aluminum) for 18
32 riser side rail of 20
34 first pivot pin of 20
36 first lock pin of 20
38 bracket arm of 20
40 second pivot pin of 20
42 second lock pin of 20
44 hook end of 20
46 durable metal material (corrosion-resistant steel) for 32, 38, 44 and 48
48 adjustable support leg of 10
50 pivotally connecting component for 48
52 hollow upper segment of 48
54 aperture in 52
56 lower segment of 48
58 adjustment hole in 56
60 lock pin of 48
62 shaft for 50

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A folding step for a recreational vehicle having an existing step at a side door, said folding step comprising:
   a) a tread; and
   b) means for attaching said tread to the existing step with said tread in front, between the existing step and the ground, so that the transition from the ground to the interior of the recreational vehicle through the side door is easier to negotiate by a person stepping up; said attaching means including:
      i) a pair of riser side rails;
      ii) a pair of first pivot pins, whereby each said first pivot pin pivotally connects a first end of one said riser side rail to a rear corner of said tread;
      iii) a pair of first lock pins, whereby each said first lock pin can be inserted through the first end of one said riser side rail and into said tread to keep said riser side rail in a stationary vertical position with respect to said tread;
      iv) a pair of bracket arms;
      v) a pair of second pivot pins, whereby each said second pivot pin pivotally connects a second end of one said riser rail to a first end of one said bracket arm;
      vi) a pair of second lock pins, whereby each said second lock pin can be inserted through the second end of one said riser side rail and into one said bracket arm to keep said bracket arm in a stationary horizontal position with respect to and away from, said tread; and
      vii) a pair of hook ends, whereby each said hook end is integral with a second end of one said bracket arm so that said bracket arms can lie on top of the exiting step of the recreational vehicle, with said hook ends engaging a rearward facing side of existing step;
   c) a pair of adjustable support legs; and
   d) means for pivotally connecting ends of each said adjustable support leg to an inner front corner of said traced, so that said adjustable support legs can pivot up into a horizontal position for storage and can also pivot down into a vertical position, to contact the ground and help stabilize said tread above the ground, wherein said pivotally connecting means includes a pair of shafts, in which each said shaft extends through an upper end of one sad adjustable support leg and the inner front corner of said tread.

2. A folding step for a recreational vehicle as recited in claim 1, wherein said tread includes a rigid skirt border that serves as a frame for a central horizontal section.

3. A folding step for a recreational vehicle as recited in claim 2, wherein said tread includes a non-skid surface on said central horizontal section.

4. A folding step for a recreational vehicle as recited in claim 1, wherein said tread is fabricated out of a lightweight sturdy material.

5. A folding step for a recreational vehicle as recited in claim 4, wherein said lightweight sturdy material is aluminum.

6. A folding step for a recreational vehicle as recited in claim 1, wherein said riser side rails are fabricated out of a durable metal material.

7. A folding step for a recreational vehicle as recited in claim 6, wherein said durable metal material is corrosion-resistant steel.

8. A folding step for a recreational vehicle as recited in claim 1, wherein said bracket arms and said hook ends are fabricated out of a durable metal material.

9. A folding step for a recreational vehicle as recited in claim 8, wherein said durable metal material is corrosion-resistant steel.

10. A folding step for a recreational vehicle as recited in claim 1, wherein each said adjustable support leg includes:
 a) a hollow upper segment having an aperture therethrough, whereby said hollow upper segment is affixed to said pivotally connecting means;
 b) a lower segment having a plurality of spaced apart adjustment holes therethrough, whereby said lower segment slide fits into said hollow upper segment; and
 c) a lock pin that is inserted through said aperture in said hollow upper segment and into one of said adjustment holes in said lower segment to keep said lower segment in a stationary position with respect to said hollow upper segment.

11. A folding step for a recreational vehicle as recited in claim 1, wherein each said adjustable support leg is fabricated out of a durable metal material.

12. A folding step for a recreational vehicle as recited in claim 11, wherein said durable metal material s corrosion-resistant steel.

13. A folding step for a recreational vehicle as recited in claim 3, wherein said tread is fabricated out of a lightweight sturdy material.

14. A folding step for a recreational vehicle as recited in claim 13, wherein said lightweight sturdy material is aluminum.

15. A folding step for a recreational vehicle as recited in claim 7, wherein said bracket arms and said hook ends are fabricated out of a durable metal material.

16. A folding step for a recreational vehicle as recited in claim 15, wherein said durable metal material is corrosion-resistant steel.

17. A folding step for a recreational vehicle as recited in claim 16, wherein each said adjustable support leg includes:
 a) a hollow upper segment having an aperture therethrough, whereby said hollow upper segment is affixed to said pivotally connecting means;
 b) a lower segment having a plurality of spaced apart adjustment holes therethrough, whereby said lower segment slide fits into said hollow upper segment; and
 c) a lock pin that is inserted through said aperture in said hollow upper segment and into one of said adjustment holes in said lower segment to keep said lower segment in a stationary position with respect to said hollow upper segment.

18. A folding step for a recreational vehicle as recited in claim 17, wherein each said adjustable support leg is fabricated out of a durable metal material.

19. A folding step for a recreational vehicle as recited in claim 18, wherein said durable metal material is corrosion-resistant steel.

* * * * *